US012125186B2

(12) United States Patent
Narayanan et al.

(10) Patent No.: US 12,125,186 B2
(45) Date of Patent: Oct. 22, 2024

(54) COLLISION MITIGATION SYSTEMS AND METHODS

(71) Applicant: ZEBRA TECHNOLOGIES CORPORATION, Lincolnshire, IL (US)

(72) Inventors: Venkateswaran Narayanan, Bangalore (IN); Sethuraman Vijayakumar, Madurai (IN); Sunil Kumar, Bangalore (IN); Anandakumar Gopalsamy, Ronkonkoma, NY (US); Ambika Nagarajaiah, Bangalore (IN); Sundaresan Sundaram, Bangalore (IN); Dayal Madhukar Rai, Bangalore (IN); Alexander Punnamoottil Jacob, Palakkad (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 357 days.

(21) Appl. No.: 17/344,468

(22) Filed: Jun. 10, 2021

(65) Prior Publication Data
US 2022/0397870 A1    Dec. 15, 2022

(51) Int. Cl.
*G06T 7/00* (2017.01)
*B60W 50/14* (2020.01)
(Continued)

(52) U.S. Cl.
CPC .......... *G06T 7/0004* (2013.01); *B60W 50/14* (2013.01); *B66F 17/003* (2013.01); *G05B 9/02* (2013.01);
(Continued)

(58) Field of Classification Search
None
See application file for complete search history.

(56) References Cited

U.S. PATENT DOCUMENTS 9,855,947 B1 *  1/2018  Penilla .............. G08G 1/096725
9,925,980 B2 *  3/2018  Edo-Ros .................. B60T 7/12
(Continued)

FOREIGN PATENT DOCUMENTS

AU    2020271069 A1 *  11/2021  ........... B65G 1/0485
AU    2020381535 A1 *   6/2022  ........... G06Q 10/047
(Continued)

*Primary Examiner* — Kevin R Steckbauer

(57) ABSTRACT

A method includes: obtaining one or more images of a facility containing objects; detecting positions of the objects in the images; determining, from the detected positions, respective locations in a facility coordinate system for each detected object; for each detected object, generating a trajectory based on the determined location; obtaining a set of computing device identifiers and corresponding computing device locations in the facility coordinate system; based on the identifiers and device locations and at least one of (i) the locations of the objects, (ii) the trajectories, or (iii) the image, detecting associations between the objects and the devices; detecting, based on the trajectories, a potential collision between a first detected object and a second detected object; in response to detecting the potential collision, selecting a computing device associated with at least one of the first and second detected objects; and transmitting a collision notification to the selected computing device.

15 Claims, 7 Drawing Sheets

(51) Int. Cl.
*B66F 17/00* (2006.01)
*G05B 9/02* (2006.01)
*G05B 19/418* (2006.01)
*G06Q 10/08* (2023.01)
*G06T 7/292* (2017.01)
*G06T 7/73* (2017.01)
*G06V 20/52* (2022.01)

(52) U.S. Cl.
CPC ......... *G05B 19/4189* (2013.01); *G06Q 10/08* (2013.01); *G06T 7/292* (2017.01); *G06T 7/74* (2017.01); *G06V 20/52* (2022.01); *G05B 2219/45049* (2013.01); *G06T 2207/30232* (2013.01); *G06T 2207/30241* (2013.01)

(56) References Cited

U.S. PATENT DOCUMENTS

| | | | | |
|---|---|---|---|---|
| 9,963,145 | B2* | 5/2018 | Penilla | H04L 67/52 |
| 10,585,440 | B1* | 3/2020 | Gariepy | G05D 1/0289 |
| 10,636,308 | B2* | 4/2020 | Glatfelter | B66F 9/0755 |
| 10,809,727 | B1* | 10/2020 | Eckman | G01C 21/206 |
| 11,198,432 | B2* | 12/2021 | Edo Ros | B60T 7/12 |
| 11,479,411 | B2* | 10/2022 | Eckman | G05D 1/0287 |
| 11,488,076 | B2* | 11/2022 | Walet | G06Q 10/08 |
| 11,572,065 | B2* | 2/2023 | Edo Ros | B60W 50/14 |
| 11,787,402 | B2* | 10/2023 | Edo Ros | B60T 7/12 701/70 |
| 2016/0090284 | A1* | 3/2016 | Svensson | B66F 9/07 701/50 |
| 2017/0197617 | A1* | 7/2017 | Penilla | G08G 1/0129 |
| 2017/0337820 | A1* | 11/2017 | Glatfelter | G08G 1/166 |
| 2018/0215378 | A1* | 8/2018 | Edo Ros | B60W 10/04 |
| 2020/0126331 | A1* | 4/2020 | Kishita | G07C 9/00896 |
| 2020/0134955 | A1* | 4/2020 | Kishita | G07C 5/008 |
| 2020/0319648 | A1* | 10/2020 | Eckman | B65G 1/1378 |
| 2021/0087031 | A1* | 3/2021 | Lunscher | G05D 1/0238 |
| 2021/0150428 | A1* | 5/2021 | Walet | G06Q 10/06313 |
| 2021/0269242 | A1* | 9/2021 | Eckman | B65G 1/0485 |
| 2022/0035341 | A1* | 2/2022 | Cella | G06F 30/27 |
| 2022/0035342 | A1* | 2/2022 | Cella | B25J 9/163 |
| 2022/0036274 | A1* | 2/2022 | Cella | G05B 13/0265 |
| 2022/0036275 | A1* | 2/2022 | Cella | G06N 3/08 |
| 2022/0036276 | A1* | 2/2022 | Cella | G06Q 10/08 |
| 2022/0036301 | A1* | 2/2022 | Cella | G06Q 10/0639 |
| 2022/0036302 | A1* | 2/2022 | Cella | G06Q 10/0835 |
| 2022/0044204 | A1* | 2/2022 | Cella | G06Q 30/0206 |
| 2022/0051171 | A1* | 2/2022 | Cella | G05B 19/4155 |
| 2022/0051184 | A1* | 2/2022 | Cella | G06Q 10/08 |
| 2022/0051361 | A1* | 2/2022 | Cella | G06Q 30/0206 |
| 2022/0058569 | A1* | 2/2022 | Cella | G06Q 30/0202 |
| 2022/0097694 | A1* | 3/2022 | Edo Ros | B60T 7/22 |
| 2022/0187847 | A1* | 6/2022 | Cella | G05D 1/0297 |
| 2022/0383585 | A1* | 12/2022 | Lee | G06T 15/08 |
| 2022/0397870 | A1* | 12/2022 | Narayanan | B66F 17/003 |
| 2023/0012941 | A1* | 1/2023 | Eckman | B65G 1/0485 |
| 2023/0043172 | A1* | 2/2023 | Tajeddin | G05D 1/0274 |
| 2023/0118813 | A1* | 4/2023 | Walet | G06Q 10/06313 705/7.23 |
| 2023/0182727 | A1* | 6/2023 | Edo Ros | B60T 8/17558 701/70 |
| 2024/0083424 | A1* | 3/2024 | Edo Ros | B60T 7/22 |

FOREIGN PATENT DOCUMENTS

| | | | | |
|---|---|---|---|---|
| AU | 2020271069 B2 | * | 7/2022 | ......... B65G 1/0485 |
| CN | 109154799 A | * | 1/2019 | ............ B65G 57/03 |
| CN | 109844671 A | * | 6/2019 | ............ B60W 10/04 |
| CN | 113287148 A | * | 8/2021 | ............ G06V 10/95 |
| CN | 113392869 A | * | 9/2021 | ............ G06F 18/241 |
| CN | 113632117 A | * | 11/2021 | ........... B65G 1/0421 |
| CN | 109844671 B | * | 4/2022 | ............ B60W 10/04 |
| CN | 114519448 A | * | 5/2022 | ........ G01C 21/3407 |
| CN | 114756031 A | * | 7/2022 | ............ B60W 10/04 |
| CN | 115280363 A | * | 11/2022 | ........ G06K 9/00201 |
| CN | 115699050 A | * | 2/2023 | ............ B25J 9/163 |
| CN | 115903826 A | * | 4/2023 | |
| EP | 3663236 A1 | * | 6/2020 | .......... B64C 39/024 |
| GB | 2551041 A | * | 12/2017 | ............ B60Q 1/525 |
| JP | 2017228284 A | * | 12/2017 | ............ B60Q 1/525 |
| JP | 2018030714 A | * | 3/2018 | ........... B25J 9/1666 |
| JP | 6538750 B2 | * | 7/2019 | ............ B60Q 1/525 |
| JP | 6964669 B2 | * | 11/2021 | .......... B64C 39/024 |
| JP | 7015119 B2 | * | 2/2022 | ........... B25J 9/1666 |
| WO | WO-2020210397 A1 | * | 10/2020 | ........... B65G 1/0485 |
| WO | WO-2021047288 A1 | * | 3/2021 | ............ B66F 9/063 |
| WO | WO-2021081603 A1 | * | 5/2021 | ........ G06K 9/00201 |
| WO | WO-2021097340 A1 | * | 5/2021 | ............ G06Q 10/047 |
| WO | WO-2022226603 A1 | * | 11/2022 | ............ G01B 11/24 |

* cited by examiner

COLLISION MITIGATION SYSTEMS AND METHODS

BACKGROUND

In facilities such as warehouses, manufacturing facilities and the like, items may be transported by vehicles such as forklifts, by workers on foot, etc. Such facilities may also contain various static objects, such as shelving and the like. The static objects can reduce visibility of the facility to the operators of vehicles and the workers mentioned above, which may lead to collisions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
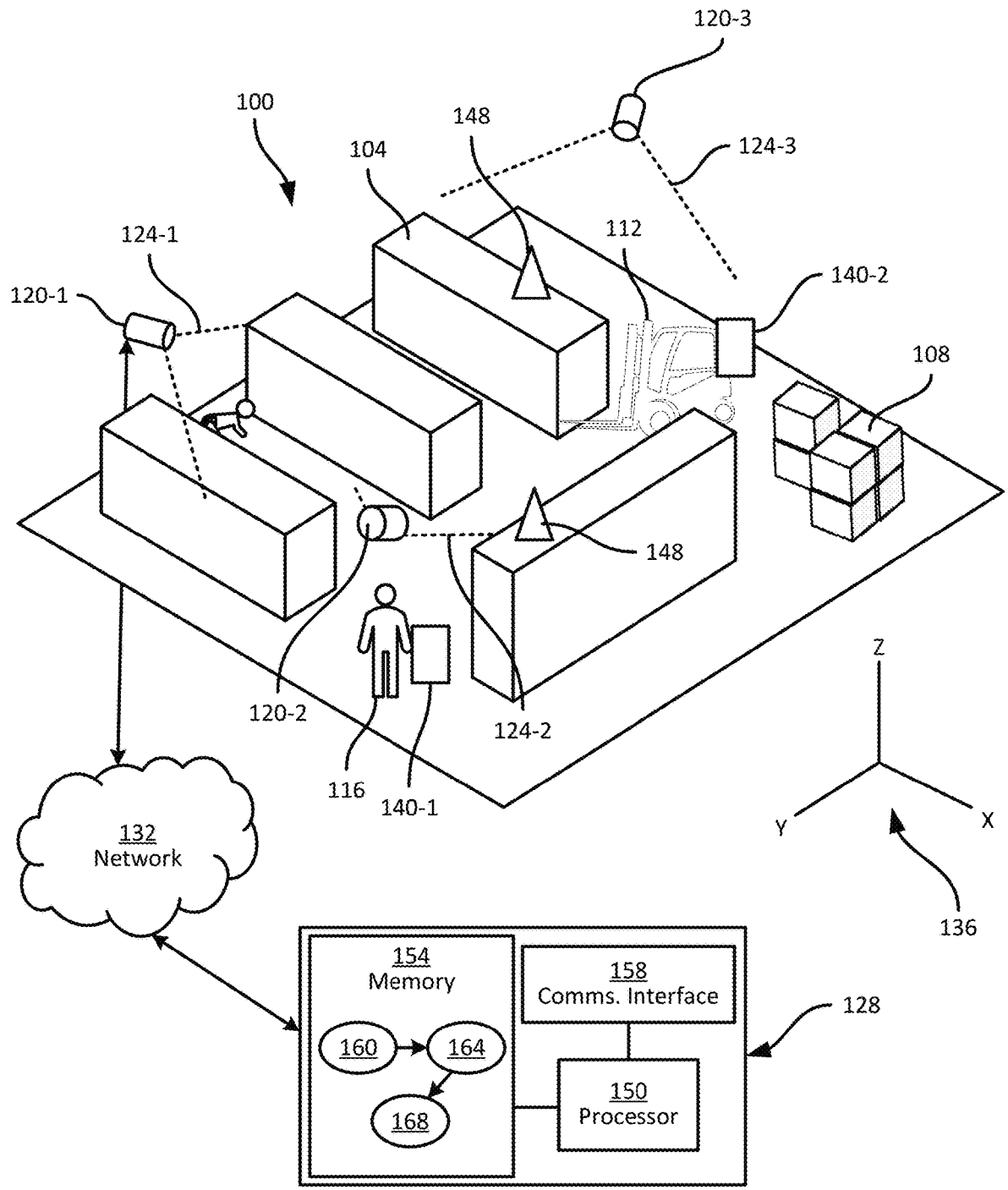
FIG. 1 is a diagram illustrating a collision mitigation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to method, comprising: obtaining one or more images of a facility containing a plurality of objects; detecting positions of the objects in the images; determining, from the detected positions, respective locations in a facility coordinate system for each detected object; for each detected object, generating a trajectory based on the corresponding determined location; obtaining a set of computing device identifiers and corresponding computing device locations in the facility coordinate system; based on the set of computing device identifiers and computing device locations and at least one of (i) the locations of the objects, (ii) the trajectories, or (iii) the image, detecting associations between the objects and the computing devices; detecting, based on the trajectories, a potential collision between a first detected object and a second detected object; in response to detecting the potential collision, selecting a computing device associated with at least one of the first detected object and the second detected object; and transmitting a collision notification to the selected computing device.

Additional examples disclosed herein are directed to a computing device, comprising: a memory; a communications interface; and a processor configured to: obtain one or more images of a facility containing a plurality of objects; detect positions of the objects in the images; determine, from the detected positions, respective locations in a facility coordinate system for each object; for each object, generate a trajectory based on the corresponding determined location; obtain a set of computing device identifiers and corresponding computing device locations in the facility coordinate system; based on the set of computing device identifiers and computing device locations and at least one of (i) the locations of the objects, (ii) the trajectories, or (iii) the image, detect associations between the objects and the computing devices; detect, based on the trajectories, a potential collision between a first detected object and a second detected object; in response to detecting the potential collision, select a computing device associated with at least one of the first detected object and the second detected object; and transmit a collision notification to the selected computing device.

FIG. 1 illustrates a collision mitigation system, deployed in a facility 100 such as a warehouse, a manufacturing facility, or the like. The facility 100 can contain a wide variety of items, such as parcels, manufacturing parts, and the like. Such items, which may be contained in boxes, on pallets, or the like, can be stored on support structures such as shelves 104 installed in the facility 100. In some cases, items can be stored on the floor of the facility, whether in a designated storage area or temporarily in a non-designated area, rather than on the shelves 104. For example, FIG. 1 illustrates items 108 stored outside the shelves 104.

The items in the facility 100 can be placed on, and retrieved from, the shelves 104 and any other suitable storage areas by either or both of transport vehicles such as forklifts (and example forklift 112 is shown in FIG. 1), and workers (an example worker 116 is shown in FIG. 1). As will therefore be apparent, the forklift(s) 112 and worker(s) 116 may traverse the facility to various designated areas in order to retrieve and/or place items therein. During such traversals, the shelves 104, as well as the items 108 and other obstacles in the facility 100, can impede visibility for the operator of a forklift 112, or for a worker 116. For example, a forklift 112 or worker 116 approaching the end of a shelf may not be able to see that another forklift 112 or worker 116 is also approaching the end of the shelf 104 from the opposite side thereof.

Reduced visibility may result in collisions between workers 116 and/or forklifts 112. The above-mentioned collision mitigation system therefore includes components and corresponding functionality to detect potential collisions between objects in the facility 100, including dynamic (moving) objects such as the forklifts 112 and workers 116, and static objects such as the shelves 104 and items 108. Further, in response to detecting a potential collision, the system is configured to generate and send notifications for presentation to at least some of the workers 116 and/or operators of the forklifts 112. For example, the system can be configured to notify the workers 116 and/or operators of the forklifts 112 involved in the predicted collision, which may enable the workers 116 and/or operators of the forklifts 112 to avoid an actual collision.

In particular, the system includes a plurality of cameras 120, of which three examples 120-1, 120-2, and 120-3 are shown in FIG. 1. Each camera 120 can be a closed-circuit security camera or any other suitable image sensor or combination of image sensors. The cameras are disposed in the facility 100 so as to each capture at least a portion of the facility 100 within a respective field of view (FOV) 124. For example, the cameras 120 can be mounted to a ceiling of the facility 100, perimeter walls of the facility 100, the shelves 104, or the like. In some examples, the combined area falling within the FOVs 124 represents substantially the entire interior of the facility 100. In other examples, however, the FOVs 124 need not provide complete interior coverage of the facility 100.

The system 100 also includes a computing device, such as a server 128, in communication with the cameras 120 via a network 132, which can be a local area network, a wide area network, or a combination thereof. The server 128, as will be described herein in greater detail, is configured to obtain images from the cameras 120 depicting areas within the facility 100. From the images, the server 128 is configured to detect objects such as the shelves 104, items 108, forklifts 112, or workers 116 mentioned above. The server 128 then determines the locations of such objects in a unified facility coordinate system 136, and generates predicted trajectories for each object. Based on the generated trajectories, the server 128 can assess the risk of a collision between two or more detected objects, and send notifications to alert workers 116, forklift operators, or others of the potential for a collision.

The notifications generated by the server 128 may be sent to further computing devices, e.g. via the network 132. Those computing devices can include mobile computing devices 140-1, 140-2 carried by the worker 116 and/or mounted to the forklift 112. The server 128 can also be configured to detect or otherwise maintain associations between objects (such as the forklift 112 and the worker 116) and computing devices 140, in order to select the appropriate device(s) 140 to which to send notifications in response to detecting a potential collision.

The network 132 can include, for example, access points (APs) 148 disposed throughout the facility 100. The access points 148 can be employed to deliver the above-mentioned notifications, and can also be employed by the server 128 to determine current locations of the devices 140 in the facility. Determining device locations, as discussed below, can be used by the server 128 to maintain up-to-date associations between devices 140 and objects (e.g. forklifts 112 and workers 116).

The server 128 includes a central processing unit (CPU), also referred to as a processor 150 or a controller, interconnected with a non-transitory computer readable storage medium, such as a memory 154. The memory 154 includes any suitable combination of volatile (e.g. Random Access Memory (RAM)) and non-volatile (e.g. read only memory (ROM), Electrically Erasable Programmable Read Only Memory (EEPROM), or flash) memory. The processor 150 and the memory 154 each comprise one or more integrated circuits (ICs).

The server 128 also includes a communications interface 158, enabling the server 128 to exchange data with other computing devices, e.g. via the network 132. The communications interface 158 therefore includes any suitable hardware (e.g. transmitters, receivers, network interface controllers and the like) allowing the server 128 to communicate over the network 132.

The memory 154 stores a plurality of computer-readable instructions, e.g. in the form of one or more applications. Execution of the instructions of a given application by the processor 150 configures the server 128 to perform certain functionality. In the present example, the memory 154 stores an object classifier application 160, whose execution by the processor 150 configures the server 128 to process images from the cameras 120 to detect objects therein. The memory 154 also stores a mapping application 164, execution of which configures the server 128 to convert the detected positions of objects from the application 160 from camera-specific coordinate systems to the facility coordinate system 136, thereby constructing a map of the facility 100 and the detected objects therein. Further, the memory 154 stores a collision mitigation application 168, execution of which configures the server 128 to generate the trajectories mentioned above from the locations generated by the application 164, and detect potential collisions from such trajectories. In other examples, the functionality implemented via execution of the applications 160, 164, and 168 can be implemented via a single application, or via a different set of applications than those illustrated in FIG. 1. In further examples, some or all of the functionality implemented via execution of the applications 160, 164, and 168 can be implemented by a special purpose controller, such as an application-specific integrated circuit (ASIC).

Figure 2:
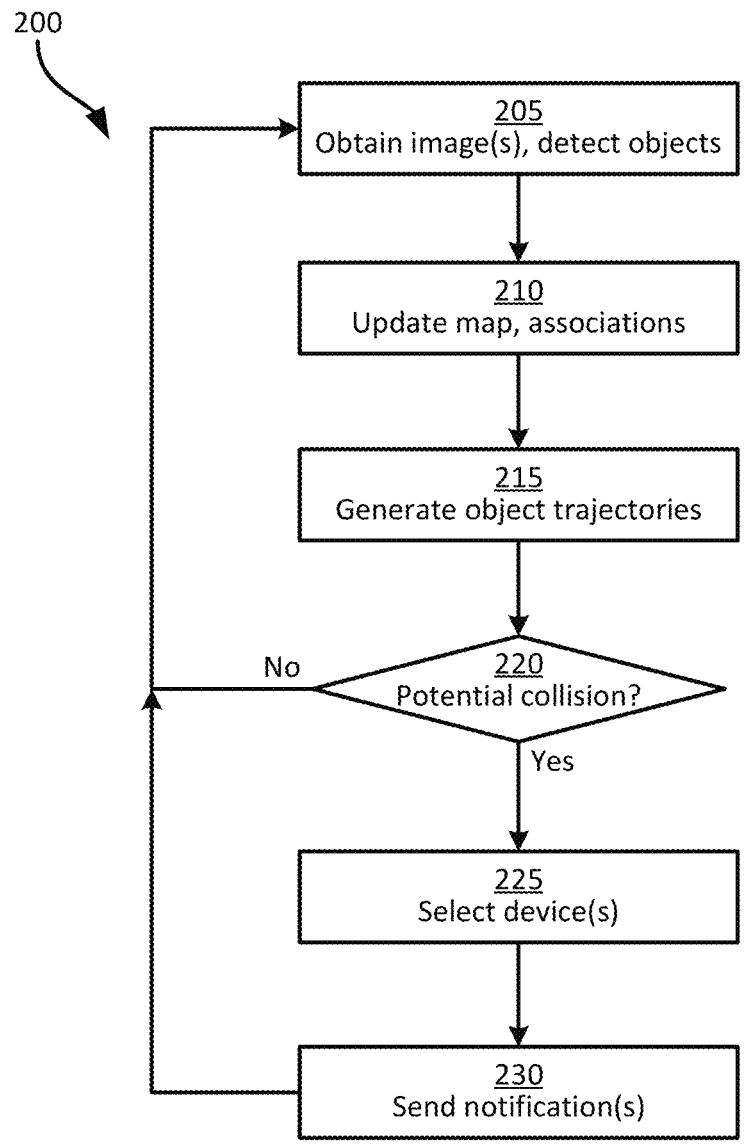
FIG. 2 is a flowchart of a collision mitigation method.

Turning to FIG. 2, a collision mitigation method 200 is illustrated. The method 200 will be discussed below in conjunction with its example performance in the system illustrated in FIG. 1. In particular, the blocks of the method 200 as described below are performed by the server 128.

At block 205, the server 128 is configured to obtain respective images from the cameras 120, and to detect objects therein. For example, each camera 120 may be configured to generate a video stream comprising multiple frames captured over a time period, and the server 128 can receive such video stream directly, or periodically retrieve frames from the video stream from another storage device connected to the network 132. In an embodiment, a camera may be configured to generate an image comprising a single frame captured at a capture time. When more than one image is retrieved at block 205 (that is, when the facility 100 includes more than one camera 120) the server 128 obtains images captured substantially simultaneously by the cameras 120, such that each image represents the same state of the facility 100. For example, the images obtained at block 205 may have been captured within about one second or less of each other, in some examples.

Having obtained the images, the server 128 is configured to detect objects within the images. Object detection at block 205 can be performed according to any suitable object detection and/or classification mechanism, including machine learning-based detectors such as the You Only Look Once (YOLO) object classification library. The object detection mechanism can be trained to detect shelves 104, items 108, forklifts 112, and/or workers 116. In some examples, the detection mechanism is configured to detect an object type in connection with each detected object. For example, detected objects can be assigned a static type, e.g. for shelves 104 and items 108, or a dynamic type, e.g. for forklifts 112 and workers 116. Such type detections may depend not only on the current images obtained at block 205, but also on preceding images, such that motion of the objects between images can be assessed in order to assign a type to the object.

In some examples, more specific object types or classes can be employed. For example, static objects can be subdivided between permanent objects, such as the shelves 104, and temporary objects, such as the items 108. As a further example, dynamic objects can be subdivided into a forklift object type and a worker object type.

The server 128 is configured to generate, for each detected object in an image, at least a position of the object, e.g. in the form of a bounding box in a coordinate system specific to the camera 120 from which the relevant image was received. Each object detection can also include a class or type of the object. In some examples, as discussed in further detail below, an object detection can also include an attribute of the object such as an object identifier distinguishing that particular object from other objects of the same type. For example, each forklift 112 can include a unique identifier, e.g. presented on a license plate, barcode, fiducial, or the like, which can be detected from an image at block 205. Workers 116 may also be identified based on facial recognition characteristics, biometric characteristics, badges, or the like.

Figure 3:
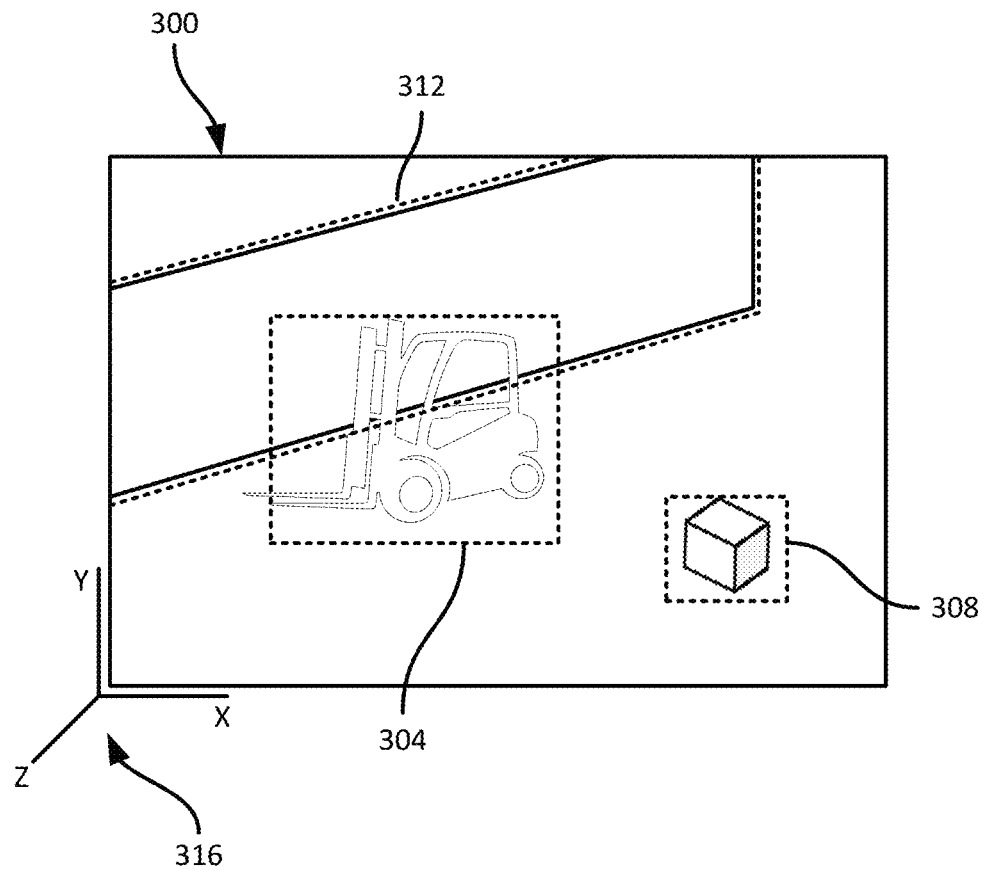
FIG. 3 is a diagram illustrating an example performance of block 205 of the method of FIG. 2.

Turning to FIG. 3, an example image 300 processed at block 205 is shown, in which bounding boxes 304, 308, and 312 are generated by the server 128 corresponding to a forklift 112, an item 108, and a shelf 104 respectively. The bounding boxes are shown as two-dimensional boundaries, but can also be defined in three dimensions. In either event, the bounding boxes are defined in a camera-specific coordinate system 316. That is, the positions of objects detected from distinct images (captured by different cameras 120) are not directly comparable, because the object positions are defined according to different coordinate systems 316.

Returning to FIG. 2, at block 210 the server 128 is configured to determine locations in the facility coordinate system 136 for each object detected at block 205. The server 128, in other words, is configured to generate or update a map of the facility 100, including any detected objects. As will be apparent, block 210 is performed by the application 164, having received the object detections from the application 160.

In the present example, to reduce the computational burden of map generation, the server 128 can update the map in two dimensions, representing an overhead view of the facility 100 but ignoring the vertical dimension, since the dynamic objects in the facility 100 are assumed to remain at a constant height with respect to a floor of the facility 100. Generating the locations of the detected objects in the facility coordinate system 136 is performed based on previously determined transformations between the camera coordinate systems 316 of each camera 120 and the facility coordinate system 136. For example, the location of each camera 120 in the facility coordinate system 136 can be established prior to initiating the method 200, e.g. at the time of installation of the cameras 120. Further, intrinsic parameters of the cameras 120 such as focal length and the like can be employed to determine a transformation, for each camera 120, between the camera coordinate system 316 and the facility coordinate system 136.

In some examples, the map generated or updated at block 210 can be overlaid on a previously stored map indicating the static, permanent objects in the facility 100 such as the shelves 104. In such examples, the object detection at block 205 can omit detection of the shelves 104, and any remaining object detections can be overlaid on the previously existing map of the facility 100.

Figure 4:
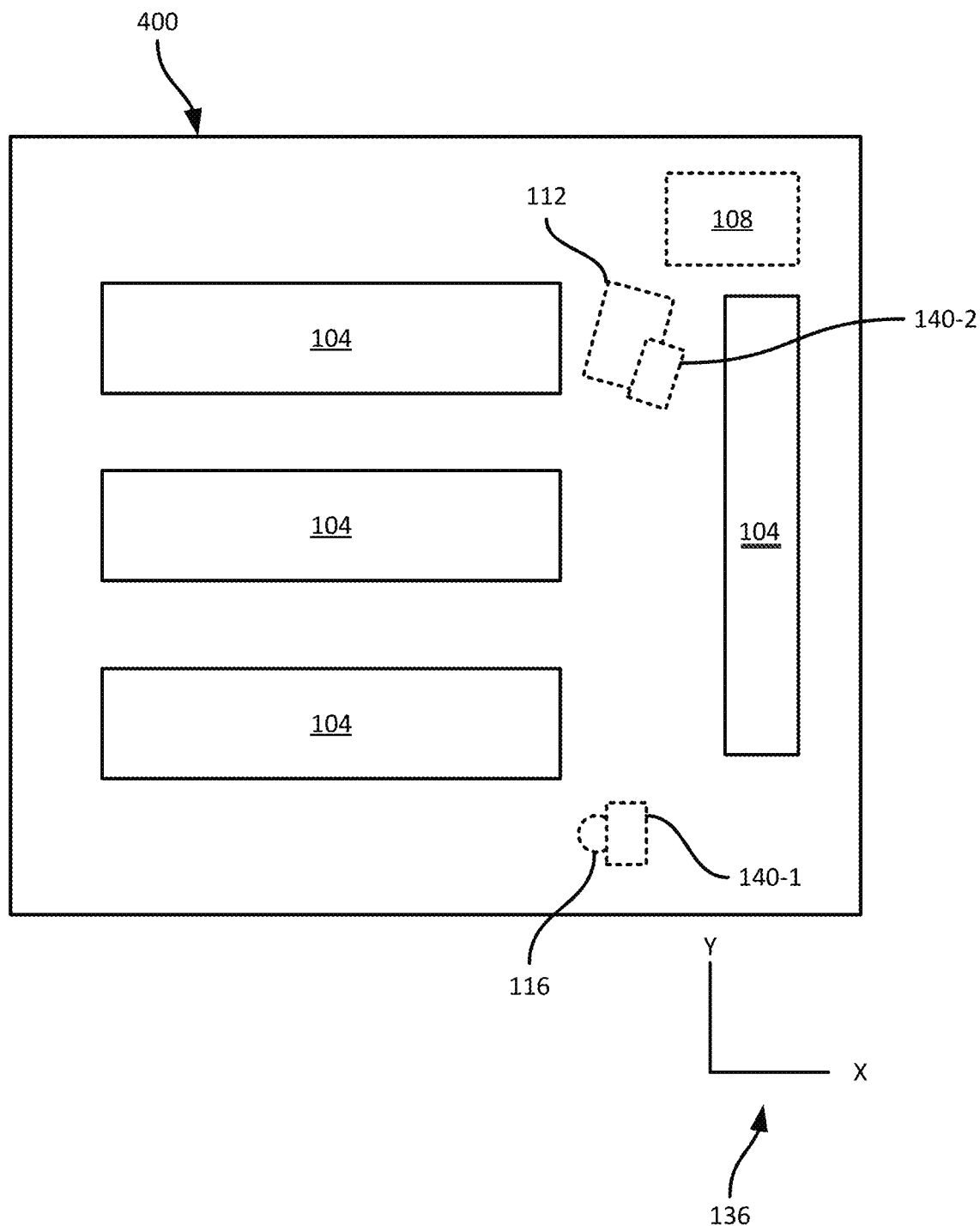
FIG. 4 is a diagram illustrating an example performance of block 210 of the method of FIG. 2.

Turning to FIG. 4, an example map 400 is shown depicting a two-dimensional overhead view of the facility 100, including predetermined positions of the shelves 104, as well as current detected locations of the items 108, the forklift 112, and the worker 116. The locations of each detected object are represented as bounding boxes, corresponding to the two-dimensional profiles of the boundaries detected at block 205 for each object.

At block 210, the server 128 can also generate or update associations between objects and computing devices 140. As noted above in connection with FIG. 1, the worker 116 can carry the computing device 140-1, while the forklift 112 or an operator thereof can carry the computing device 140-2. More generally, at least some of the dynamic objects in the facility can be physically associated with computing devices 140 that can receive collision notifications from the server 128. The associations between objects and computing devices 140 may not be known to the server 128 beforehand, however, or may change periodically.

To detect associations between computing devices 140 and objects, the server 128 can be configured to also determine locations for each computing device 140. The locations of computing devices 140 may not be determined from the images collected at block 205. Instead, the devices 140 may include global positioning system (GPS) sensors, and can be configured to periodically report a sensed position to the server 128 for the server to determine the device location. In other examples, a device 140 may measure signal strength, round-trip time (RTT) or other characteristics of RF signals from the access points 148, in order to determine device locations, which can then be reported to the server 128. In further examples, beacons (e.g. BLE beacons) can be used by the devices 140 for locationing instead of, or in addition to, the APs 148. In an embodiment, an AP 148 may measure signal strength, round-trip time (RTT) or other characteristics of an RF signal from a device 140 for locating the device 140.

FIG. 4 illustrates detected locations of the computing devices 140. The device locations are shown as bounding boxes for visibility, but in practice device locations can also be coordinates in the coordinate system 136. The server 128 can detect associations between devices 140 and other detected objects based on proximity. For example, from the map of FIG. 4, the server 128 can calculate a distance between a device 140 location and a detected object location, compare the calculated distance to a threshold, and create a device/object association for a device object combination for which the calculated distance is below the threshold. Thus, in this example, the device 140-1 is associated with the worker 116, while the device 140-2 is associated with the forklift 112.

In some examples, in which object identifiers such as the above-mentioned license plate or facial recognition features enable the server 128 to identify specific instances of objects such as forklifts 112 and workers 116, the server 128 can store associations between identifiers of the devices 140 (e.g. MAC addresses or the like), and identifiers of the objects (e.g. forklift identifiers, names of workers 116, or the like). In such examples, in which the objects have previously assigned identifiers, associations between objects and devices 140 can also be predefined and stored in a repository accessible to the server 128, in which case the server 128 need not detect associations at block 210. In an embodiment, an ID of an object or person may be entered into a device 140 to store an association on the device or at the server 128, such as capturing an image of a license plate of a forklift or scanning a barcode associated with a person.

In other examples, where object identifiers are not available, or cannot be detected from the image, the server 128 can assign arbitrary object identifiers to detected objects, and can store the device identifiers in association with such arbitrary object identifiers in response to detecting associations at block 210.

Figure 5:
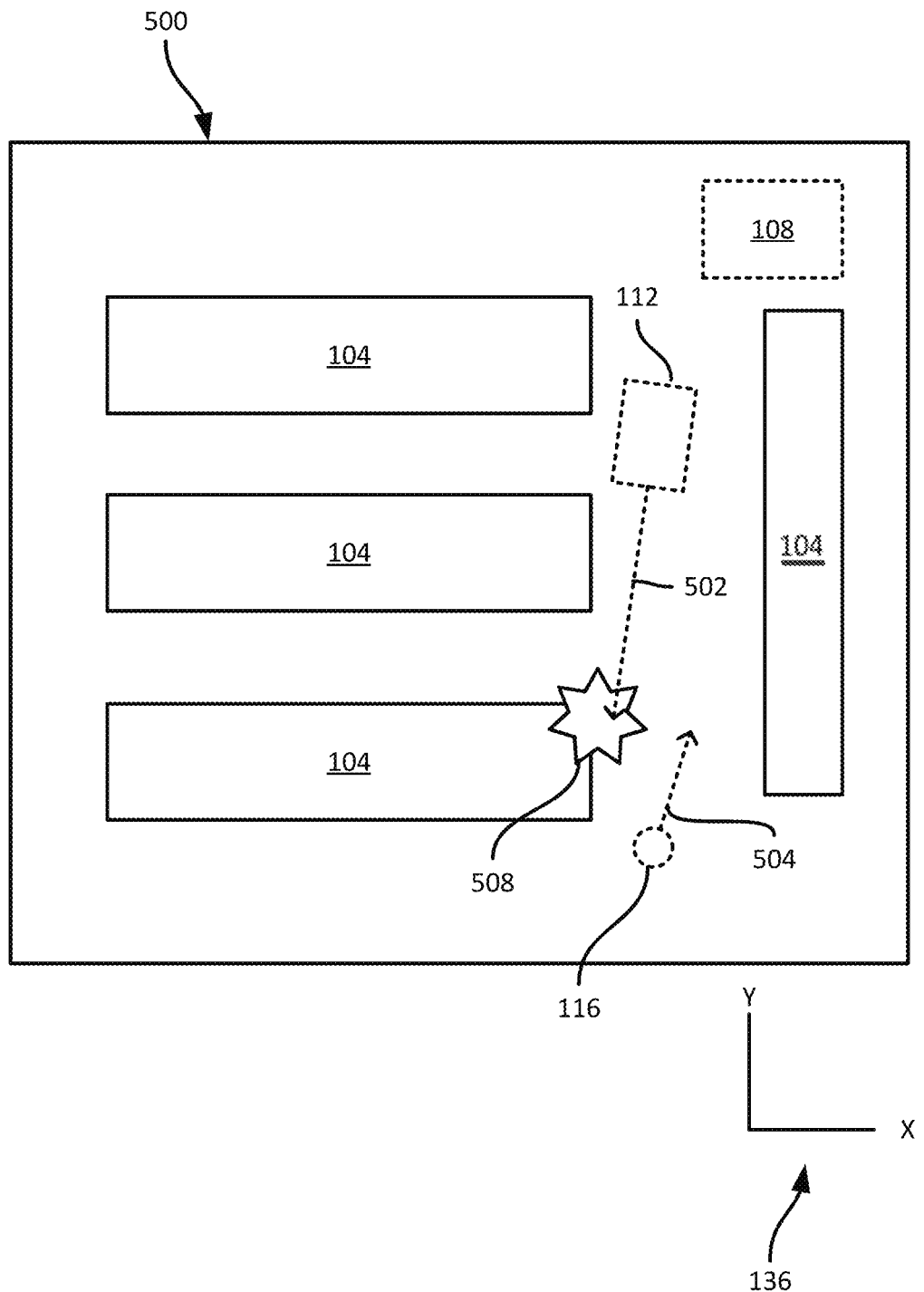
FIG. 5 is a diagram illustrating an example performance of block 215 of the method of FIG. 2.

Returning to FIG. 2, at block 215 the server 128 is configured to generate object trajectories, indicating a predicted path for each dynamic object over a future time period (e.g. over the next ten seconds, although shorter and longer time periods may also be employed). Trajectory generation may be omitted for objects classified as static. Generation of trajectories may include comparing a current location of an object with one or more previously determined locations of the same object, e.g. in the previous performance of block 210. Turning to FIG. 5, for example, an updated map 500 is shown, resulting from a further performance of blocks 205 and 210, showing updated locations for the forklift 112 and the worker 116. Based on the differences between the current and previous locations of each dynamic object, and on the time elapsed between the current and previous locations, the server 128 can generate an estimated velocity for each dynamic object (i.e. a direction of movement, and a speed of movement).

The estimated velocities can then be employed to generate trajectories 500 and 504 for the forklift 112 and the worker 116, respectively. As noted above, the trajectories illustrate the expected movement of the corresponding object over a defined future time period, and thus the trajectory 502 for the forklift 112 is longer than the trajectory 504, because the speed of the forklift 112 is greater.

Returning to FIG. 2, at block 220 the server 128 is configured to determine, based on the trajectories generated at block 215, whether the trajectories indicate any potential collisions. A potential collision can occur when the trajectories of two or more dynamic objects intersect, and/or when the trajectory of a dynamic object intersects with the boundary of a static object. Referring again to FIG. 5, the trajectory 502 intersects with a shelf 104 at an intersection 508, near the end of the trajectory 502. However, the server 128 can also be configured to evaluate one or more attributes of any such intersections to determine whether the intersection represents a potential collision. For example, the server 128 can evaluate either or both of a time attribute and a distance attribute.

In the example of FIG. 5, either or both of the distance between the current location of the forklift 112 and the location of the intersection 508 can therefore be assessed. Such attributes can be compared to respective thresholds or other criteria. For example, if the distance is greater than a threshold, the server 128 can determine that no potential collision exists. Further, if the time period within which the forklift 112 is expected to reach the intersection 508 exceeds a threshold, the determination at block 220 can also be negative. In other words, the criteria mentioned above can be selected to reduce the likelihood of generating collision warnings for potential collisions that are sufficiently distant, physically and/or in time, to not warrant such notifications. In some examples, the server 128 can generate a score for each intersection indicating a likelihood of a collision at the intersection. The score can be generated from the above-mentioned attributes, e.g. in a weighted combination. A score that meets a criterion (e.g. exceeding a threshold) can result in an affirmative determination at block 220.

When the determination at block 220 is negative, the server 128 returns to block 205. When the determination at block 220 is affirmative, however, the server 128 is configured to proceed to block 225, and select at least one computing device 140 to notify of the potential collision. In the present example, the server 128 is configured to select any devices 140 that are associated (as a result of the performance of block 210) with objects involved in the potential collision. That is, the server 128 can be configured to retrieve the device identifiers of any devices 140 associated with the objects whose trajectories and/or boundaries intersect and resulted in the positive determination at block 220.

Figure 6:
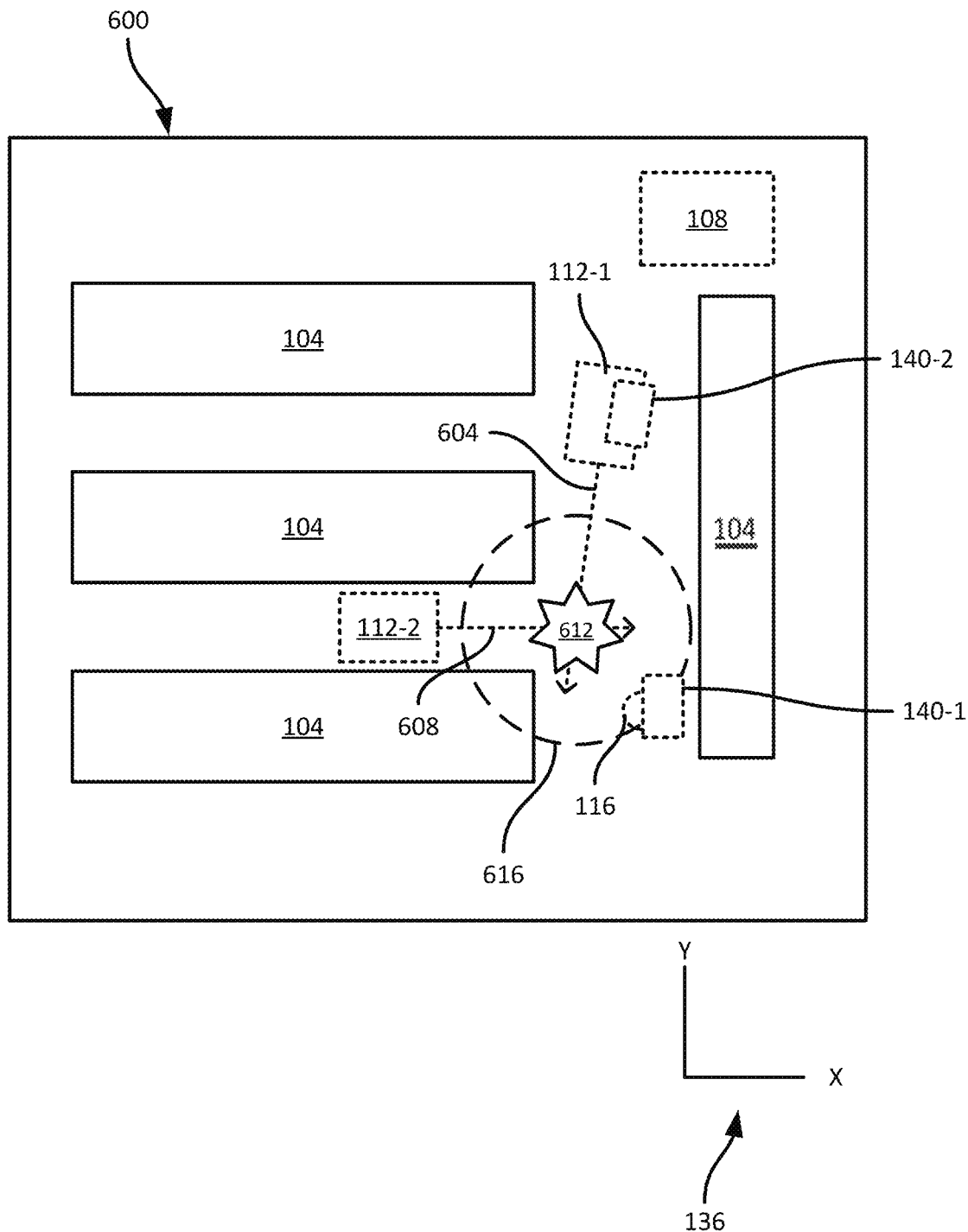
FIG. 6 is a diagram illustrating an example performance of blocks 215-225 of the method of FIG. 2.

In some examples, the server 128 can also retrieve device identifiers associated with other objects that are not directly involved in the potential collision, but are within a threshold distance of the potential collision and/or a current location of an involved object. For example, referring to FIG. 6, another example map 600 is shown in which the trajectories 604 and 608 of a first forklift 112-1 and a second forklift 112-2 have an intersection 612 that satisfies the criteria applied at block 220. From the current locations of the forklifts 112-1 and 112-2, the operators of each forklift 112 may not be able to see the other forklift 112 around the corner of the shelf 104.

The server 128 can therefore select the device 140-2 at block 225, as well as a device 140 associated with the forklift 112-2, if one exists. In some examples, the server 128 can also select the device 140-1 associated with the worker 116, because the current location of the worker 116 is within an area 616 generated according to a predefined radius from the intersection 612.

Figure 7:
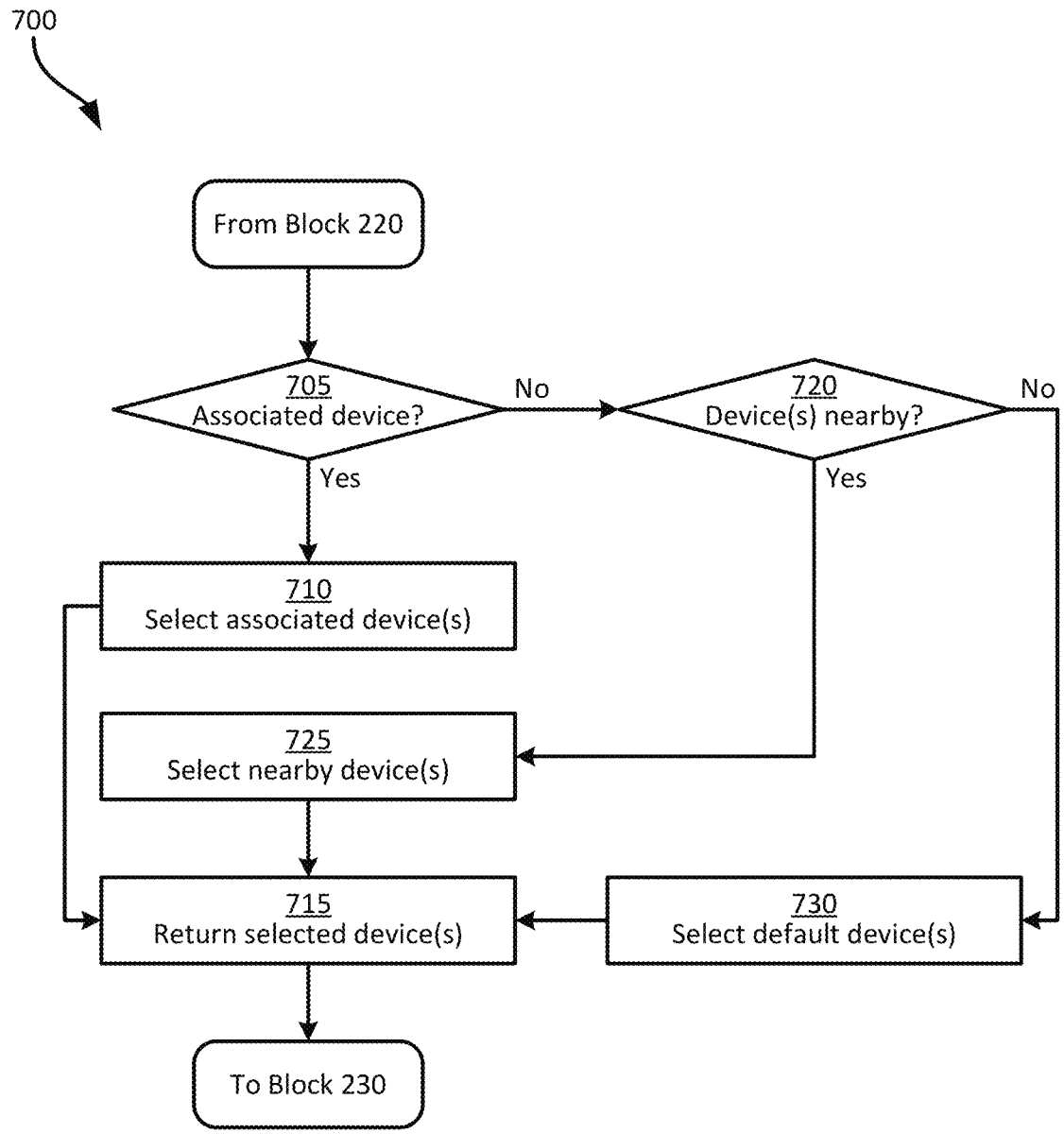
FIG. 7 is a flowchart illustrating a method of performing block 225 in the method of FIG. 2.

FIG. 7 illustrates an example method 700 of performing the selection of devices at block 225. At block 705, the server 128 is configured to determine whether the associations updated at block 210 indicate that any of the devices 140 are associated with the objects involved in the potential collision detected at block 220. That is, the server 128 determines, for each object involved in the potential collision, whether a computing device 140 was previously associated with the object, e.g. based on the location of the object and the location of the device 140, and/or based on the identifiers of the object and the device 140. When the determination at block 705 is affirmative, as with the device 140-2 and the object 112-1 shown in FIG. 6, the server 128 selects the associated device (i.e. the device 140-2, in the above example) at block 710, and at block 715, returns the selection for use at block 230 of the method 200.

When the determination at block 705 is negative, e.g. for a case in which a forklift is involved in a potential collision, but no device association was detected for that forklift, the server 128 can proceed to block 720. At block 720, the server 128 can determine whether any devices 140 are within a predetermined distance of the potential collision, as noted in connection with the area 616 in FIG. 6. At block 725, when one or more devices 140 are within predetermined distance of the potential collision, the server 128 selects those devices 140. When the determination at block 720 is negative, however, the server 128 can select a default device 140 at block 730. The default device can include a previously designated device 140 operated by a manager in the facility, placed at a fixed location in the facility, or the like. In some examples the default device can include a set of devices, up to and including every device in the facility. As will be apparent, the selections above may be combined. For example, devices 140 specifically associated with the objects involved in the potential collision can be selected, in addition to devices 140 within a predetermined distance of the potential collision.

Returning to FIG. 2, at block 230, the server 128 is configured to send notifications to the device(s) 140 selected at block 225. The notifications can include commands to the selected devices 140 to display information therein, generate audible alerts, or a combination thereof. For example, a notification can include an indication of the direction of the potential collision, relative to the current location of the relevant device 140. The notification can include the map or a portion thereof that contains the intersection 612. The notification can also include operational commands in some examples, including suggested actions (e.g. slow down, stop immediately, etc.).

In implementations in which the forklifts 112 or other vehicles have the ability to receive remote control commands, the notification can include a remote control command, e.g. to apply an emergency brake or the like. In such examples, the server 128 can be configured to compare the score mentioned above to a first threshold to determine whether a potential collision exists, and to a second threshold to determine whether the potential collision is imminent. Potential collisions that meet the first threshold but not the second can result in the sending of notifications without operational commands that seize control of a forklift remotely, while potential collisions that also meet the second threshold can result in the sending of notifications that also remotely control the relevant forklift(s) to execute an emergency stop or the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:
1. A method, comprising:
obtaining one or more images of a facility containing a plurality of objects;
detecting positions of the objects in the images;
determining, from the detected positions, respective locations in a facility coordinate system for each detected object;
for each detected object, generating a trajectory based on the corresponding determined location;
obtaining a set of computing device identifiers and corresponding computing device locations in the facility coordinate system;
based on the set of computing device identifiers and computing device locations and at least one of (i) the locations of the objects, (ii) the trajectories, or (iii) the image, detecting associations between the objects and the computing devices;

detecting, based on the trajectories, a potential collision between a first detected object and a second detected object;

in response to detecting the potential collision, selecting a computing device associated with at least one of the first detected object and the second detected object; and transmitting a collision notification to the selected computing device, wherein:
  detecting the potential collision includes:
    identifying a pair of trajectories that intersect,
    comparing an attribute of the intersection to a criterion,
    when the attribute meets the criterion, detecting the potential collision, and
    the attribute is a time period between a current time and an expected arrival time of the first detected object and the second detected object at the intersection.

2. The method of claim 1, wherein obtaining the image includes:
  capturing a set of images using a plurality of cameras disposed throughout the facility; and
  detecting the positions of the objects in coordinate systems corresponding to respective ones of the cameras.

3. The method of claim 2, further comprising: transforming the positions of the objects to the facility coordinate system prior to generating the trajectories.

4. The method of claim 1, wherein generating the trajectories includes:
  periodically repeating the obtaining, detecting, and determining;
  determining a velocity for each object; and
  generating the trajectory from the velocity.

5. The method of claim 1, wherein the attribute further comprises a distance between at least one of the first detected object and the second detected object and the location of the intersection.

6. The method of claim 1, wherein detecting the objects includes: selecting a type for each detected object, wherein the type is one of dynamic and static.

7. The method of claim 1, wherein obtaining an identifier of the computing device includes:
  simultaneously with obtaining the one or more images, obtaining a location of the computing device; and
  associating the computing device with at least one of the objects by comparing the location of the computing device with the locations of the objects.

8. A computing device, comprising:
  a memory;
  a communications interface; and
  a processor, configured to:
    obtain one or more images of a facility containing a plurality of objects;
    detect positions of the objects in the images;
    determine, from the detected positions, respective locations in a facility coordinate system for each object;
    for each object, generate a trajectory based on the corresponding determined location;
    obtain a set of computing device identifiers and corresponding computing device locations in the facility coordinate system;
    based on the set of computing device identifiers and computing device locations and at least one of (i) the locations of the objects, (ii) the trajectories, or (iii) the image, detect associations between the objects and the computing devices;
    detect, based on the trajectories, a potential collision between a first detected object and a second detected object;
    in response to detecting the potential collision, select a computing device associated with at least one of the first detected object and the second detected object; and
    transmit a collision notification to the selected computing device,
  wherein the processor is further configured to:
    capture the one or more images using a plurality of cameras disposed throughout the facility,
    detect the positions of the objects in coordinate systems corresponding to respective ones of the cameras, and
    transform the positions of the objects to the facility coordinate system prior to generating the trajectories.

9. The computing device of claim 8, wherein to generate the trajectories the processor is configured to:
  periodically repeat obtaining images, the detection, and the determination;
  determine a velocity for each object; and
  generate the trajectory from the velocity.

10. The computing device of claim 8, wherein to detect the potential collision the processor is configured to:
  identify a pair of trajectories that intersect;
  compare an attribute of the intersection to a criterion; and
  when the attribute meets the criterion, generate a potential collision detection.

11. The computing device of claim 10, wherein the attribute is a time period between a current time and an expected arrival time of the first detected object and the second detected object at the intersection.

12. The computing device of claim 10, wherein the attribute is a distance between at least one of the first detected object and the second detected object and the location of the intersection.

13. The computing device of claim 8, wherein to detect the objects the processor is configured to select a type for each detected object, wherein the type is one of dynamic and static.

14. The computing device of claim 8, wherein to obtain the identifier of the computing device the processor is configured to:
  simultaneously with obtaining the one or more images, obtain a location of the computing device; and
  associate the computing device with at least one of the objects by comparing the location of the computing device with the locations of the objects.

15. A method, comprising:
  obtaining one or more images of a facility containing a plurality of objects;
  detecting positions of the objects in the images;
  determining, from the detected positions, respective locations in a facility coordinate system for each detected object;
  for each detected object, generating a trajectory based on the corresponding determined location;
  obtaining a set of computing device identifiers and corresponding computing device locations in the facility coordinate system;
  based on the set of computing device identifiers and computing device locations and at least one of (i) the locations of the objects, (ii) the trajectories, or (iii) the one or more images, detecting associations between the objects and the computing devices;

detecting, based on the trajectories, a potential collision between a first detected object and a second detected object;

in response to detecting the potential collision, selecting a computing device associated with at least one of the first detected object and the second detected object; and transmitting a collision notification to the selected computing device, wherein obtaining an identifier of the computing device includes:

simultaneously with obtaining the one or more images, obtaining a location of the computing device, and associating the computing device with at least one of the objects by comparing the location of the computing device with the locations of the objects.

* * * * *